UNITED STATES PATENT OFFICE.

GEORG FRERICHS, OF BONN, GERMANY.

PROCESS OF MAKING TOMATO EXTRACT.

1,174,248. Specification of Letters Patent. Patented Mar. 7, 1916.

No Drawing. Application filed March 19, 1914. Serial No. 825,809.

*To all whom it may concern:*

Be it known that I, GEORG FRERICHS, a citizen of the German Empire, and residing at Bonn, Germany, have invented a certain new and useful Improved Process of Making Tomato Extract, of which the following is a specification.

My invention relates to the manufacture of tomato extract similar to meat extract.

Vegetable juices contain substances which are similar to or in part the same as those dissolved in meat juice. Products which are to be employed as seasoning instead of meat extract have been made from vegetable juices, *e. g.* from vegetable extracts, by inspissating the juices without or with an admixture of salts, particularly sodium chlorid, or of iron salts and calcium salts. If vegetable juices which contain sugar, as is the case in most of our vegetables, are employed for manufacturing such extracts, products are obtained in which the sugar so hides the remaining substances that the extracts have only very little similarity with meat extract. Only vegetable juices free from sugar can yield extracts which are really similar to meat extract. Thus, as is well known, a product actually similar to meat extract is obtained from yeast by inspissating the juice or extract which is obtained in very various manners from fresh yeast and which is of course free from sugar.

A primary object of my invention is to make extracts from the juice of tomatoes which, apart from yeast extract, are much more similar to meat extract than the vegetable extracts known heretofore, and are therefore adapted in many cases wholly or partially to substitute meat extracts in the preparation of foods. To this end, I remove the sugar from the tomato juice, by the known process of fermentation by yeast, either before or after the removal of the juice from the tomato pulp.

It is known to make vegetable extracts by means of alcoholic fermentation from parts of vegetables and liquids containing carbohydrates capable of fermentation. The purpose of this known process, however, is to make medicinally useful extracts from drugs, such as *e. g.* cinchona bark, or medicinal wines, the object of the alcoholic fermentation being to produce an alcoholic liquid which dissolves the active, previously undissolved constituents of the drugs. In the fermentation of the sugar of vegetable juice according to the process described hereinafter, however, substances are no longer dissolved since all the substances contained in the fermented juice have already been dissolved in the unfermented juice.

I have found that it is absolutely necessary to separate the juice of the tomatoes before the fermentation from the insoluble constituents of the tomato pulp, the skin and seeds. The pulp obtained by mashing the tomatoes may be mixed with yeast, whereupon the juice may be separated after the termination of the fermentation and inspissated. In this case also substances are no longer dissolved. The quantity of the resulting alcohol (tomatoes contain only about 2 to 3 per cent. sugar) is much too small to cause a dissolving action.

*Examples.*

1. Fresh or cooked tomatoes are pressed or centrifuged, whereupon the juice obtained is mixed with yeast, if desired after being boiled and cooled for the purpose of sterilization. The fermented juice is liberated by filtration or centrifuging from the yeast and evaporated to a thin or thick extract, if desired to dryness.

2. The pulped tomatoes are mixed with yeast, if desired after being boiled and cooled for the purpose of sterilization. After fermentation is complete the juice is separated by pressure or centrifuging and is inspissated.

The extract thus obtained may be employed as seasoning.

I claim:—

A process of making a tomato extract consisting in fermenting pulped tomatoes, in separating the fermented juice therefrom and in inspissating the separated juice.

In testimony whereof, I affix my signature in the presence of two witnesses.

GEORG FRERICHS.

Witnesses:
 LOUIS VANDORY,
 CARL SEIGUR.

Copies of this patent may be obtained for five cents each, by addressing the "Commissioner of Patents, Washington, D. C."